J. W. BRENKERT.
VEHICLE SIGNAL APPARATUS.
APPLICATION FILED MAY 13, 1919.

1,331,860.   Patented Feb. 24, 1920.

INVENTOR.
Joseph W. Brenkert
BY A. B. Bowman
ATTORNEY

UNITED STATES PATENT OFFICE.

JOSEPH W. BRENKERT, OF SAN DIEGO, CALIFORNIA.

VEHICLE SIGNAL APPARATUS.

1,331,860. Specification of Letters Patent. Patented Feb. 24, 1920.

Application filed May 13, 1919. Serial No. 296,791.

*To all whom it may concern:*

Be it known that I, JOSEPH W. BRENKERT, a citizen of the United States, residing at San Diego, in the county of San Diego and State of California, have invented a certain new and useful Vehicle Signal Apparatus, of which the following is a specification.

My invention relates to a signaling apparatus for vehicles for indicating the direction or action that a vehicle is about to take when moving upon the streets and the objects of my invention are: first, to provide an apparatus of this class which may be used at one side of the vehicle for indicating when a vehicle will turn to the right, left, slow down or stop; second, to provide an apparatus of this class which is applicable for use with the various makes of vehicles now in use; third, to provide an apparatus of this class in which an arm is moved to various positions and held in such position until actuated by the operator for indicating the direction or action of the vehicle; fourth, to provide an apparatus of this class in which all of the necessary actions of a vehicle may be indicated from the driver's side of the vehicle and fifth, to provide an apparatus of this class which is very simple and economical of construction, durable, easy of operation, easy to install and which will not readily deteriorate or get out of order.

Figures 1, 2:
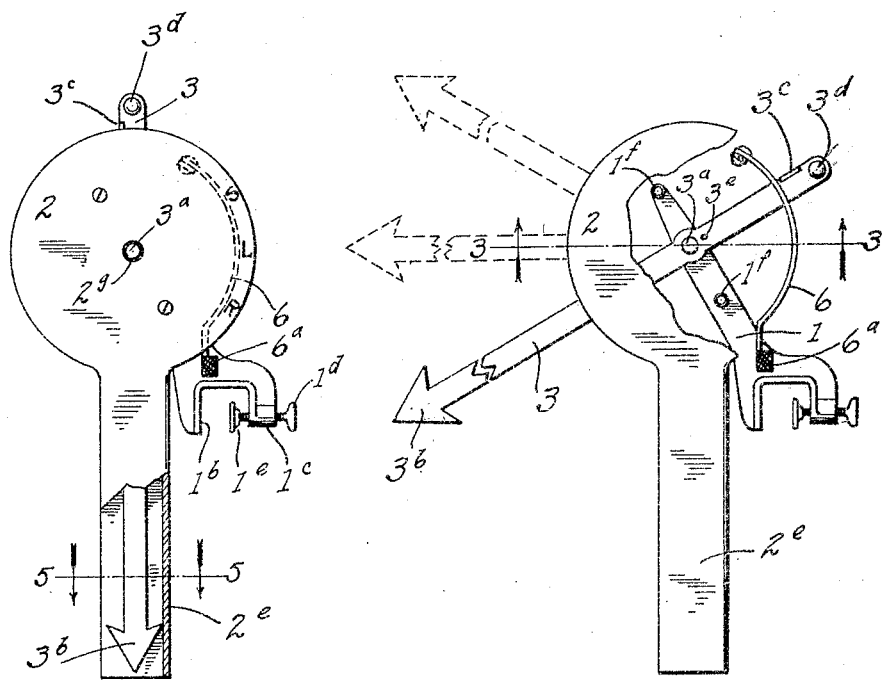
Figure 3:
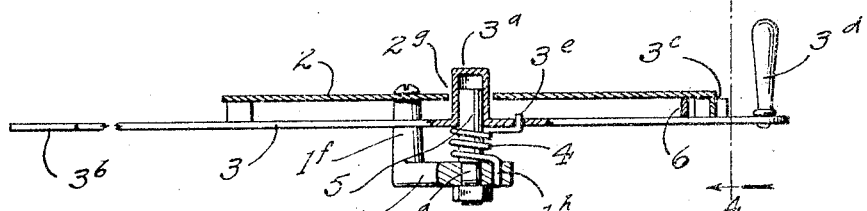
Figure 4:
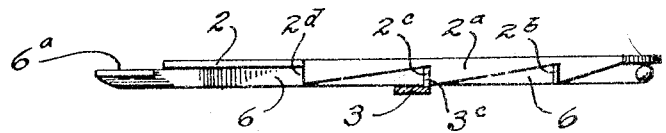
Figure 5:
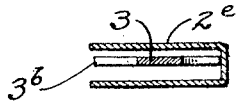

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my apparatus and showing the indicating arm in neutral position and showing a portion broken away and in section to facilitate the illustration; Fig. 2 is a similar view showing the arm in position for slow down or stop by solid lines and showing by dotted lines the positions taken for turning to the left and right and showing a portion broken away to facilitate the illustration; Fig. 3 is a sectional view through 3—3 of Fig. 2 on an enlarged scale; Fig. 4 is a sectional view through 4—4 of Fig. 3 and Fig. 5 is a sectional view through 5—5 of Fig. 1 on an enlarged scale.

Similar characters of reference refer to similar parts and portions throughout the several views of the drawings.

The supporting member 1, casing 2, arm member 3, spring 4, pin 5 and lever 6 constitute the principal parts and portions of my vehicle signaling apparatus.

The supporting member 1 consists of a bar provided with a hole $1^a$ therein adapted for the reduced portion of the pin 5 so that the pin 5 may be secured thereto. It is provided on its extended ends with a bifurcated portion with members $1^b$ and $1^c$ and mounted in the member $1^c$ is a screw $1^d$ upon the inner end of which is a swivel member $1^e$ thus forming a clamp for clamping the device to the upper edge of the vehicle body or the door, or this clamp member may be positioned backwardly and be secured to a vertical support if desired. The opposite end of this member 1 is provided with a lug $1^f$ to which is secured the casing 2 which is circular in form at its upper portion and provided with an inwardly extending flange $2^a$ which is provided with notches $2^b$, $2^c$ and $2^d$ therein. It is provided with a downwardly extending U shaped portion $2^e$ which is adapted as a housing for the arm portion $3^b$ of the member 3 when in the position shown in Fig. 1 of the drawings. Mounted over the end of the pin 5 is a socket $3^a$ on the arm member 3 which extends through a hole $2^g$ in the member 2. This socket is an integral portion of the arm member 3 one side of which is extended and is provided with an arrow point $3^b$ on its extended end, this being the preferable construction. However, it is obvious that this extended arm may be in any desirable shape or form. The opposite end of said arm is provided with an integral lug $3^c$ which is adapted to engage the notches $2^b$, $2^c$ and $2^d$ in the flange $2^a$ and on the outwardly extending end of said member 3 is provided a handle $3^d$. Mounted around the pin 5 is a combined, compression and torsion spring 4 tending to hold the arm member 3 into engagement with the member 2 at all times and also tending to hold said arm member 3 in the position shown in Fig. 1 of the drawings. The one end of said spring 4 being mounted in a hole $3^e$ in the member 3 and the other end in a hole $1^h$ in the member 1. Pivotally mounted on the inner surface of the casing 2 is a lever 6 which is preferably curved as shown best in Figs. 1 and 2 of the drawings and extends downwardly between the casing 2 and the member 3 and on its lower extending end is provided a finger engaging portion 6<sup>a</sup>.

The operation of the apparatus is as follows: The apparatus is secured to the vehicle body by means of the clamp consisting of the members 1<sup>b</sup>, 1<sup>c</sup>, 1<sup>d</sup>, 1<sup>e</sup>, and the portion 2<sup>e</sup> extending downwardly and the arm in the position shown in Fig. 1. If it is desired to slow down or stop the operator grasps the handle 3<sup>d</sup> and moves it downwardly to a position directly under the letter S on the member 2 which is an indication that the vehicle will slow down or stop. If he desires to turn to the left he moves the handle portion 3<sup>d</sup> downwardly to directly under the letter L which carries the arrow end 3<sup>b</sup> upwardly to a horizontal position and it is held in either of these positions by the notches 2<sup>d</sup> and 2<sup>c</sup>. If it is desired to turn to the right he lowers the handle member 3<sup>d</sup> downwardly to the position opposite the letter R and it is held in position by means of the notch 2<sup>b</sup>. After making the turn the apparatus is placed in neutral position by pressing inwardly on the member 3<sup>a</sup> which compresses the spring 4, throws the lug 3<sup>c</sup> out of engagement with the notches and the arm 3 drops to a neutral position by gravity with the aid of the spring 4. In case, however, the apparatus is mounted so that it is difficult to reach the members 3<sup>a</sup> for releasing the arm it may be accomplished by pressing on the member 6<sup>a</sup> of the lever 6 which will disengage the lug 3<sup>c</sup> from the notches 2<sup>b</sup>, 2<sup>c</sup> or 2<sup>d</sup>.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

Having thus described my invention what I claim as new and desire to secure by Letters Patent, is:

1. In a vehicle signaling apparatus, a clamp support, an arm member provided with a socket journaled on said support, another member secured to said support provided with a guide on one side and notches in its opposite side adapted for engagement with an extended portion of said arm and a spring in said socket member tending to hold said arm in engagement with said notches.

2. In a vehicle signaling apparatus, a casing provided with notches in one side and a guide surface at its opposite side, means for securing it to a vehicle body, an arm member provided with a socket journaled in said casing and extending from the opposite side thereof and a spring mounted centrally in said casing tending to hold the one end of said arm in engagement with the notches in said casing.

3. In an apparatus of the class described, a supporting member, a casing member secured to said supporting member, an arm member pivotally mounted between said support and said casing and a combined compression and torsion spring connecting said arm member with said support tending to hold said arm member in engagement with said casing and the extended end of said arm member in vertical position.

4. In an apparatus of the class described, a supporting member provided with a clamp adapted to be secured to a vehicle body, a casing member provided with a downwardly extending inclosure portion secured to said support, an arm member pivotally mounted between said support and said casing and a combined compression and torsion spring connecting said arm member with said support tending to hold said arm member in engagement with said casing and the extended end of said arm member in the vertical position.

5. In an apparatus of the class described, a supporting member provided with a clamp adapted to be secured to a vehicle body, a casing member provided with a downwardly extending inclosure portion secured to said support, an arm member pivotally mounted between said support and said casing, a combined compression and torsion spring connecting said arm member with said support, tending to hold said arm member in engagement with said casing and the extended end of said arm member in a vertical position and means to facilitate the compression of said spring and release of said arm.

In testimony whereof I have hereunto set my hand at San Diego, California, this 6th day of May, 1919.

JOSEPH W. BRENKERT.